UNITED STATES PATENT OFFICE.

CHARLES M. MARTIN, OF WASHINGTON, DISTRICT OF COLUMBIA, ASSIGNOR TO THE FIRE-EXTINGUISHER COMPANY OF AMERICA, OF PHILADELPHIA, PENNSYLVANIA.

FIRE-EXTINGUISHING COMPOUND.

SPECIFICATION forming part of Letters Patent No. 431,985, dated July 8, 1890.

Application filed October 11, 1889. Serial No. 326,723. (No specimens.)

*To all whom it may concern:*

Be it known that I, CHARLES M. MARTIN, a citizen of the United States of America, residing at Washington, District of Columbia, have invented certain new and useful Improvements in Fire-Extinguishing Compounds, of which the following is a specification.

It is well understood that the fire-extinguishing compounds now in use give off gases the instant the ingredients are brought into union, and that consequently they lose much of their usefulness during their passage from the apparatus to the flames.

My invention comprehends a neutral fire-extinguishing compound—that is to say, a compound which generates no gases on the union of its ingredients, but which requires to be brought into contact with heat before the gases will be given off.

I am aware that fire-extinguishing compounds, consisting of hyposulphite of soda and muriate of ammonia, have been used; but I do not claim such compound in itself.

In making my improved compound I take, say, sixty pounds sodium chloride, thirty pounds sodium hyposulphite, six pounds sal-ammoniac, two and one-half pounds magnesium sulphate, one-half pound magnesium chloride, one-half pound calcium oxide, and one-half pound iron oxide. These ingredients are combined in the proportions above indicated and dissolved in water, the compound being readily soluble in the proportion of three pounds of the mixture to one gallon of water.

When the compound has been prepared as above described and thrown upon fire, it at once emits sulphurous-acid gas, in combination with free chlorine and ammoniacal gas, which instantly extinguishes the flames and renders the inflammable material incombustible.

The solution is to be thrown from the apparatus by means of air-pressure.

Having thus described my invention, what I claim is—

The herein-described chemical fire-extinguishing compound, consisting of sodium chloride, sodium hyposulphite, sal-ammoniac, magnesium sulphate, magnesium chloride, calcium oxide, and iron oxide, mixed in the proportions described and dissolved in water, as above set forth.

In testimony whereof I affix my signature in presence of two witnesses.

CHARLES M. MARTIN.

Witnesses:
WM. HUNTER MYERS,
FRANK B. MARLOW.